Patented Jan. 24, 1950

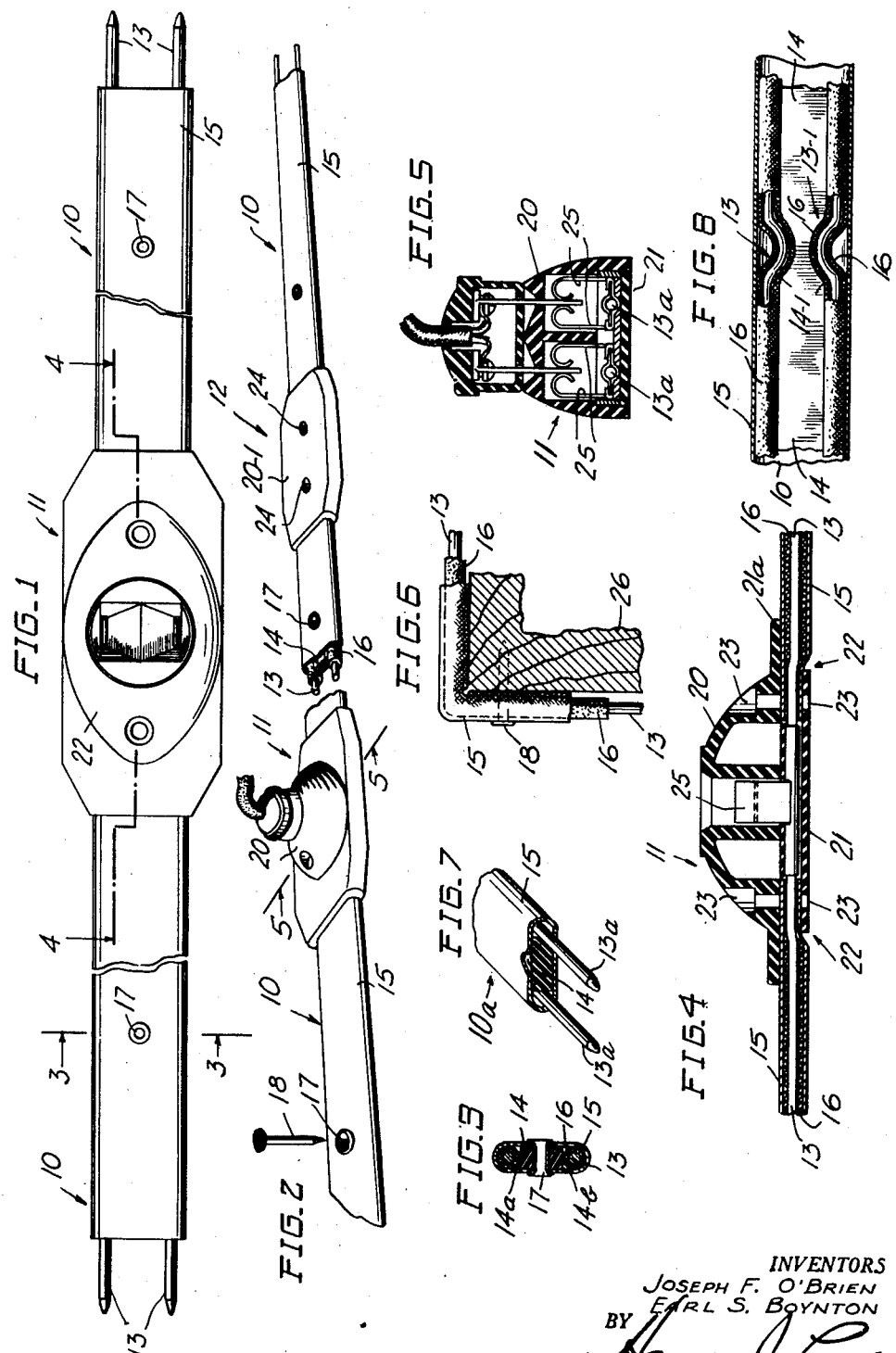

2,495,280

UNITED STATES PATENT OFFICE 2,495,280

COMPOSITE ELECTRICAL CONDUCTOR STRIP

Joseph F. O'Brien, Lebanon, and Earl S. Boynton, East Orange, N. J., assignors to John B. Pierce Foundation, New York, N. Y., a corporation of New York Application March 7, 1946, Serial No. 652,598

2 Claims. (Cl. 174—117)

The invention relates to improved composite electrical conductor strip and strip units.

More particularly the invention relates to composite electrical conductor strips and conductor unit strips especially adapted for use in surface wiring systems.

Embodiments of the invention may be manufactured in the form of units prefabricated for direct assembly on the job, or in the form of running strip for cutting and fitting at the site of installation.

The composite electric wiring strip pursuant to the invention may be used as a component part of surface wiring installations of various types and forms, providing electrical conductors protectively encased and properly insulated.

A principal object of the invention is to provide composite electrical wiring strip which is rugged and durable, capable of use per se of indefinite lengths, in exposed or surface types of electrical wiring systems or as prefabricated conductor units or sections with auxiliary elements to form an integrated electrical wiring system, the ends of the electrical conductors of each unit or section being arranged to effect electrical and mechanical connections with such auxiliary devices respectively, and nevertheless which is flexible in installation, adapted to conform generally to angular and other irregular supporting surfaces, including turning of corners, without having its structural and electrical qualities impaired.

A feature of embodiments of the invention resides in the substantially free association of the component electrical conductors and the spacing and insulating element of the strip whereby displacement of the conductors relative to the spacing and insulating element is permitted without affecting the utility of the conductor strip. Thus, any deformation of the component elements of the strip due to bending or to any stresses and strains encountered in handling, storing and installing the electric system is self-accommodated.

Further objects and features of the invention will be more fully understood from the following detailed description of preferred embodiments illustrated in the accompanying drawings, in which:

Fig. 1 is a plan view of an assembled portion of a surface wiring system comprising preformed units of composite wiring strip pursuant to the invention and including a convenience outlet interconnecting unit.

Fig. 2 is a perspective view of a portion of the wiring system illustrated in Fig. 1 and showing an added portion, illustrating the use of an interconnecting outlet unit for joining individual conductor-carrying strips; also an electrical utility plug—shown in place in the outlet unit, and a nail—shown about to be driven through an eyelet of a conductor strip thereby illustrating a manner of installing the wiring strip system to a suitable supporting surface.

Fig. 3 is a sectional view taken on the line 3—3 of Fig. 1, shown on a somewhat enlarged scale.

Fig. 4 is a sectional view taken on the line 4—4 of Fig. 1.

Fig. 5 is a sectional view taken on the line 5—5 of Fig. 2, somewhat enlarged.

Fig. 6 is a fragmentary view in elevation, showing a portion of a composite wiring strip, pursuant to the invention, bent sharply to round a corner of a supporting surface, shown fragmentarily.

Fig. 7 is a fragmentary view illustrating another embodiment of the invention.

Fig. 8 is a fragmentary view, partly in section, showing a preferred construction for limiting lengthwise displacement of the electrical conductors within the encasing of the conductor-carrying strip.

Referring particularly to the preferred wiring system illustrated in Figs. 1, 2 and 3, the individual conductor-carrying units 10 are shown interconnected by the convenience outlet unit 11 and by the interconnector unit 12, the stated units 11 and 12 being in themselves novel and forming the subject matter of our copending application Ser. No. 652,600, filed March 7, 1946 and entitled "Interconnection devices for electrical wiring systems."

As indicated in the drawings, each conductor-carrying unit 10 comprises a plurality of electrical conductors, two such conductors being employed in the illustrated embodiment, designated 13, 13. Such conductors are held in mutually spaced relation by the intervening and spacing strip 14 of electrically insulating material, and such assembly is encased by a sleeve 15, also of electrically insulating material.

Each electrical conductor is preferably individually wrapped by pliable insulating material, such as fiber-glass fabric or fabric sleeve, indicated 16 in the drawings. The sleeve formation of insulation material is preferred, in that such formation affords relative displacement of the encased conductor without impairing its insulating function.

As shown, each conductor 13 is preferably of rod formation, conveniently provided by copper wire of the range No. 10 to No. 14 for usual requirements, particularly for installations requiring angular bending of the assembly. Tubular electrical conductors may be employed for installations in which the bending is limited to arcuate formations.

The spacing and insulating strip 14 is desirably of general rectangular cross-section, thus imparting a relatively flat configuration to the stated conductor-carrying assembly. Such relatively flat assembly is of particular advantage when it is necessary or desirable to curvedly or angularly bend or otherwise alter the linear configuration of the assembly. Fig. 6 illustrates the conductor carrying strip bent at a right angle, proper relationship of the electrical conductors 13, 13, the spacing and insulating strip 14 and the insulating casing 15 being nevertheless maintained. A supporting surface is indicated at 26 in Fig. 6, and a nail 18 as a securing element.

Further, the spacing and insulating strip 14 advantageously has a width considerably greater than its thickness, as shown, and a degree of flexibility to permit bending to curved or angular shape without impairing its attributes of shape-retaining stiffness and rigidity and to maintain the electrical conductors in predetermined lateral spacing from one another. A resin-impregnated fiber composition serves these purposes admirably even though there may arise a tendency toward surface fracture in the circumstance of bending the assembly to a sharp angle. It is preferred that the thickness of the spacer strip 14 be approximately equal to the outside diameter of one of the electrical conductors 13 as sheathed by its insulating sleeve 16.

The protective, electrically insulating sleeve 15 is advantageously of a seamless or seamed tube of yieldable plastic material, such as a flexible vinyl plastic which is available in a range of wall thicknesses tested for effective electrical insulation for the commercial range of electric potential.

In the production of embodiments of the invention, the stated component elements may be inserted individually, or as an assembled group, in their stated relative positions, the tubing being in flattened status; or the tubing may be drawn over the stated component elements. Such procedure may be followed in the production of either running wiring strips of any indefinite length, as may be desired, or of relatively short units of predetermined lengths. The encompassed conductor and spacing elements and the tubular sleeve extend longitudinally of the strip as an entirety, and it is preferable that the inner perimeter and/or the nature of the material of the casing 15 be selected to afford a degree of looseness about the encompassed elements, which attribute is eminently possessed by flexible vinyl plastic tubing.

The protective sleeve 15 may be secured to the spacer strip 14 at relatively wide intervals along its length, as by means of eyelets 17, which advantageously serve also to receive suitable fastening elements, such as nails, see 18, Fig. 2, or screws or the like, for attaching the conductor strip or unit or section to a desired supporting surface.

It is noted that the inner component elements of the wiring strip are not secured to one another, but are assembled within the encasing sleeve 15 to afford relative freedom of movement of such enclosed component elements, and to conform the linear configuration of the wiring strip to any irregularities of the supporting surface, as may be encountered in commercial practice. It is further noted that the opposite edge faces 14a and 14b of the spacer element 14 are advantageously flat to thereby afford a limited degree of freedom of relative individual displacement of the electrical conductors 13. In such manner the structural and electrical qualities of the wiring strip are preserved, notwithstanding the alterations in shape of the conductor strip incident to installation.

Preformed units or sections, pursuant to the invention, may be employed in seriatim connection with suitable auxiliary units, as illustrated in Figs. 1 and 2, to provide an integrated electrical wiring system. Such auxiliary units, for example, are outlet units, interconnecting units without outlet provision, and the like, which are assembled in seriatim, together with a supply feed unit to complete the wiring system.

The illustrated outlet unit 11 and the illustrated interconnecting unit 12 are particularly advantageous in serving as such auxiliary units, in that their constructions afford ready seriatim mechanical and electrical interconnection with the surface wiring strip of the instant invention, although applicable to surface wiring systems generally.

These interconnecting units 11 and 12 are described in detail and claimed in our aforementioned copending application Ser. No. 652,600, and accordingly are not herein dealt with at length; they do possess certain novel structural characteristics, however, which are now referred to.

Briefly, such units 11 and 12 comprise a housing, indicated 20 in the instance of the outlet or receptacle unit 11 and 20—1 of the interconnecting unit 12. The differences between the housings in the two instances, as well as differences between other essential parts of the two units, reside in the provision structurally for the plugging of utility appliance plugs into electrical connection with the outlet contacts of the receptacle unit, as illustrated in Fig. 5.

Both units include contact-retaining bottom assemblies, such as that designated 21, see Figs. 4 and 5, which cooperate with the housing to provide for protected and concealed mechanical and electrical connection with the bared ends of the electrical conductors of the wiring strip 10. It is herein noted that the structural and functional characteristics of the passageways 22 of each unit 11, 12, affords insertion of the end portions of the wiring strip interiorly of both end formations of the unit and attains positive mechanical and electrical interconnection and concurrently affords flush relationship of the wiring strip with the supporting surface at the points of insertion. Provision is also made, as indicated at 23, 23, namely holes, in the instance of the outlet unit 11, and as at 24, 24, also holes, in the body of the interconnector unit 12, for positive securement by a nail, screw or the like of the wiring strip jointly to the unit 12 to the supporting structure; such securing element passes through the spacer element 14 of the wiring strip.

The contact-retaining bottom assemblies include outlet contact elements, indicated at 25, see Figs. 4 and 5, which provide for frictional electrical and mechanical engagement with the bare terminal ends 13a of the conductor elements 13 of the wiring strip. The essential parts of the interconnector unit 12 are identical with the corresponding parts of the outlet unit 11, except that the unit is not provided with any outlet contacts.

As illustrated in Fig. 7 it is at times desirable to eliminate the insulation 16 of the conductors 13, in such circumstance the protective outer casing 15 is selected to provide the required dielectric strength.

In all forms of the invention it is desirable to prevent undue longitudinal movement of the component elements of the wiring strip relative to one another. With respect to the outer protective sleeve 15 and the inner spacer element 14 this is advantageously accomplished by the eyelets 17, aforedescribed. With reference to the conductors 13, this is conveniently accomplished by providing offsets, such as those indicated at 13—1 in Fig. 8, disposed at relatively widely spaced intervals along the lengths of the individual electrical conductors, which offsets 13—1 coordinate with corresponding contoured notches 14—1, formed in the edge faces of the spacer strip 14.

While the invention is here illustrated and described with respect to certain preferred specific embodiments thereof, it is to be understood that various changes may be made therein and various other types thereof may be constructed without departing from the generic spirit of the invention and the scope of the appended claims.

We claim:
1. A composite electrical wiring strip comprising in combination: electrical conductor rods disposed lengthwise of the strip; a spacer element of stiff, yet yieldable electrically insulating material interposed between said electrical conductors and disposed lengthwise of the strip, said spacer element serving to maintain the respective electrical conductors in mutually spaced relation within the strip; said conductor rods and said spacer element having mating offsets at intervals along their length for preventing longitudinal movement of said conductor rods relatively to the strip; a yieldable, protective electrically insulating casing extending lengthwise of the strip and encompassing said conductors and said interposed spacer element; and means securing said protective casing to said spacer element along the length of the strip; said component parts of the strip being otherwise free and non-adherent to permit limited relative movement thereof during the installation of said wiring strip.

2. A composite electrical wiring strip comprising in combination: electrical conductor rods disposed lengthwise of the strip; a spacer element of stiff, yet yieldable electrically insulating material interposed between said electrical conductors and disposed lengthwise of the strip, said spacer element serving to maintain the respective electrical conductors in mutually spaced relation within the strip; said conductor rods being crimped inwardly at intervals along their length, and said spacer element being correspondingly notched for receiving the crimped portions of said rods in substantially locking coordination to restrict longitudinal movement of said rods within said strip; a yieldable protective electrically insulating casing extending lengthwise of the strip and encompassing said conductors and said interposed spacer element; and means securing said protective casing to said spacer element along the length of the strip; said component parts of the strip being otherwise free and non-adherent to permit limited relative movement thereof during the installation of said wiring strip.

JOSEPH F. O'BRIEN.
EARL S. BOYNTON.

REFERENCES CITED

The following references are of record in the file of this patent:

UNITED STATES PATENTS

| Number | Name | Date |
|---|---|---|
| 454,546 | Sperry | June 23, 1891 |
| 910,241 | Stewart | Jan. 19, 1909 |
| 2,293,911 | Morton et al. | Aug. 25, 1942 |
| 2,349,412 | Douglas | May 23, 1944 |

FOREIGN PATENTS

| Number | Country | Date |
|---|---|---|
| 8,290 | Great Britain | of 1900 |
| 180,020 | Great Britain | May 15, 1922 |

OTHER REFERENCES

"Vinylite Wire and Cable Insulation Plastics," page 4, April 10, 1945.